Sept. 25, 1923.  H. BACHARACH  1,468,854
PRESSURE GAUGE
Filed Jan. 5, 1921

INVENTOR
Herman Bacharach
by
James C. Bradley
atty

Patented Sept. 25, 1923.

1,468,854

UNITED STATES PATENT OFFICE.

HERMAN BACHARACH, OF PITTSBURGH, PENNSYLVANIA, ASSIGNOR TO BACHARACH INDUSTRIAL INSTRUMENT COMPANY, A CORPORATION OF PENNSYLVANIA.

PRESSURE GAUGE.

Application filed January 5, 1921. Serial No. 435,110.

*To all whom it may concern:*

Be it known that I, HERMAN BACHARACH, a citizen of the United States, and a resident of Pittsburgh, in the county of Allegheny and State of Pennsylvania, have made a new and useful Invention in Pressure Gauges, of which the following is a specification.

The invention relates to pressure gauges. It has for its principal objects the provision of an improved and simplified construction; (1) in which the casing may be made in the form of a single casting; (2) in which the gauge glass is protected by the casing; (3) which requires no cross connections between the glass and the pressure chamber; (4) which permits a ready adjustment of the level of the liquid in the gauge; and (5) which involves the foregoing advantages in a construction in which the zero point of the glass is visible. The gauge has the further advantages of compactness and good appearance. Certain embodiments of the invention are illustrated in the accompanying drawings wherein—

Figure 1:
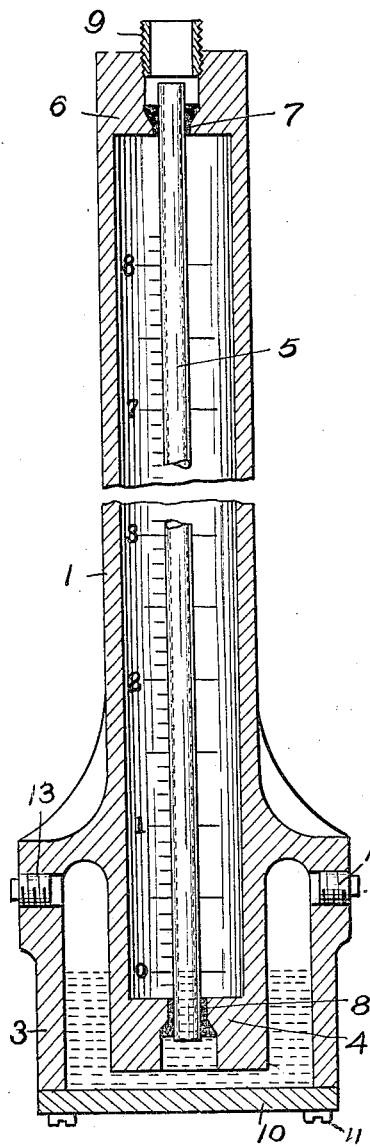
Figures 2, 5:
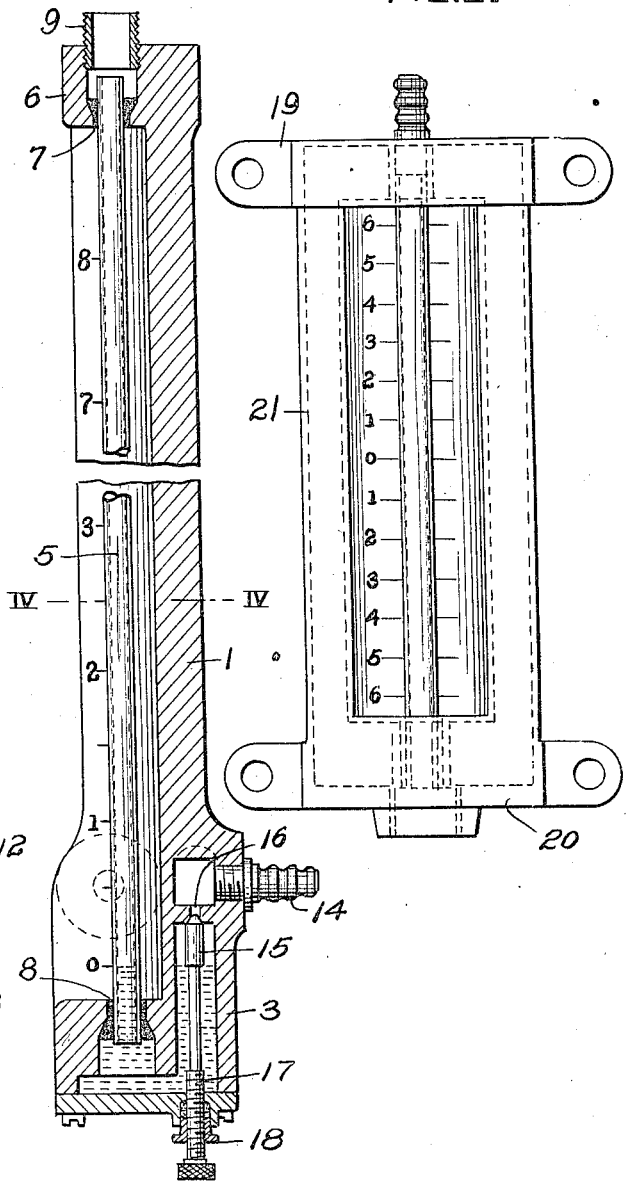
Figure 3:
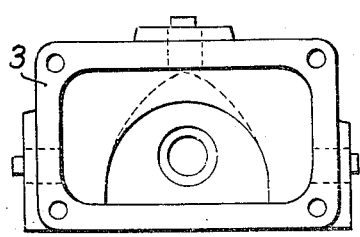
Figure 4:
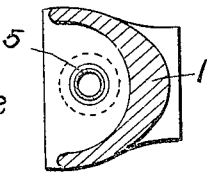

Figure 1 is a vertical section through the gauge. Fig. 2 is a similar section taken at right angles to the section of Fig. 1. Fig. 3 is a bottom plan view with the closure cap removed. Fig. 4 is a transverse section on the line IV—IV of Fig. 2. And Fig. 5 is a front elevation of a modified construction.

In the preferred embodiment, the gauge is made in the form of a U-shaped casting, hollow at its lower end and with the gauge glass fitting in the concave portion with its lower end extended into the U-shaped cavity containing the liquid employed for indicating the pressure, as a one piece casing is simple and less expensive than one made in several parts, but if desired, the casing may be made up of cast and pressed sections fitted together to provide a casing of substantially the same shape as the cast casing. A portion of the top of the U-shaped chamber into which the gauge glass extends is depressed so that the level of the liquid in the chamber lies above the top of the chamber thus exposing to view the zero point on the gauge. This arrangement is advantageous since the gauge glass is protected by the U-shaped casing while at the same time preserving the advantage of an arrangement wherein the zero point is visible and cross connections are avoided since the glass has its end extended through the top of the chamber being suitably packed at such point. Where it is desired to take readings below the zero point as well as above it, a form of casing is employed in which the hollow chamber extends upward a considerable distance above such zero point and in some instances, the full length of the gauge.

Referring to the drawings, 1 is what may be termed the scale wall since it carries the graduations, such wall being U-shaped in cross section as indicated in Fig. 4 and having at its lower end the U-shaped chamber or receptacle 3. A portion of the top of the receptacle is depressed as indicated at 4 and perforated to receive the gauge glass. The gauge glass 5 extends through the perforation in the wall 4 at its lower end and at its upper end is received by a perforation in the part 6 of the scale wall, suitable packing 7 and 8 being provided around the glass where it passes through the metal. A coupling 9 is provided at the upper end of the casing 1 by means of which a connection may be made with a threaded pipe. The receptacle 3 is closed by means of the plate 10 held in place by the screws 11.

The gauge is preferably constructed so that the connection to the receptacle 3 may be made from any side, Fig. 2 showing the connection 14 at the rear side of the receptacle, the openings at the sides being closed by the screw plugs 12 and 13. Although not required in the simpler forms of construction the device illustrated in Fig. 2 may be employed for closing the inlet to the chamber when the device is being carried about. This device is particularly useful when employed in a physician's gauge or an engineer's testing outfit, which must be carried from place to place and may be turned in transportation to various positions. When so used, a screw cap is of course required to close the coupling 9 at the upper end of the gauge. The device referred to comprises a valve member 15 seating in the end of the passage 16 and having a threaded stem 17 extending through the bottom plate 10 and suitably packed by a stuffing box device 18. When screwed to the position illustrated the passage 16 is closed so that any escape of liquid from the chamber is avoided. The member 15 also serves the additional function as a device for regulating the level of the liquid in the chamber. As the member 15 is moved downward it displaces more and more liquid thus raising the level of the liquid. The level may thus be brought to the exact zero point when it becomes necessary to use this device.

Fig. 5 illustrates a modified construction in which the upper and lower portions 19 and 20 may be made of castings with an intermediate portion 21 of pressed metal, the U-shaped receptacle in this case, extending the full length of the gauge with the zero point at the middle of the gauge, so that readings may be taken an equal distance in both directions. A variety of other arrangements might be made depending upon conditions to be met, the primary requirement being, however, the use of the U-shaped casing or receptacle having a depressed portion to receive the end of the gauge glass so that the zero point of the liquid is visible above the depressed portion.

The advantages of the device will be apparent to those skilled in the art. Aside from the compactness and appearance of the device, the advantages of simplicity and low cost of construction are combined with those of safety and the possibility of seeing the zero point of the glass without the necessity of cross connections such as are required when the glass is seated against the front of a vertical tube or chamber such as that employed with the ordinary gauge. The glass is protected in the cavity of the casing and the cost reduced to a minimum because of the simplicity of making the connection with the receptacle incident to merely extending the glass through the top of the chamber and packing it at such point.

What I claim is:

1. In combination in a gauge, a receptacle for an indicating liquid, a gauge glass connected thereto, a displacement member in the chamber, a stem for said member extending through the bottom wall of the receptacle and provided with operating means exterior of the receptacle, and means for preventing a leakage of liquid along the stem.

2. In combination in a gauge, a receptacle for an indicating liquid having an inlet passage above the level of the liquid provided with a valve seat, a gauge glass connected to the receptacle, and a vertically movable combined valve and displacement member having a threaded adjusting stem operable from the exterior of the receptacle and adapted to close the inlet passage when moved to its uppermost position, and to displace liquid in the receptacle and adjust the level thereof upwardly when moved downward.

3. In combination in a gauge comprising a casting consisting of a vertically extending receptacle U-shaped in horizontal cross section open at its lower end and a scale wall extending upward from the receptacle, a gauge glass extending through the upper wall of the receptacle along said wall, a removable plate closing said open end of the receptacle, and a displacement member carried by said plate for vertical adjustment with an operating stem extending through the plate.

In testimony whereof I have hereunto subscribed my name this 3rd day of Jan., 1921.

HERMAN BACHARACH.